United States Patent
Schmidt et al.

(10) Patent No.: US 11,710,247 B2
(45) Date of Patent: Jul. 25, 2023

(54) SYSTEM FOR IMAGE COMPOSITING INCLUDING TRAINING WITH SYNTHETIC DATA

(71) Applicant: Weta Digital Limited, Wllington (NZ)

(72) Inventors: Tobias B. Schmidt, Wellington (NZ);
Erik B. Edlund, Wellington (NZ);
Dejan Momcilovic, Wellington (NZ);
Josh Hardgrave, Wellington (NZ)

(73) Assignee: UNITY TECHNOLOGIES SF, San Francisco, CA (US)

( * ) Notice: Subject to any disclaimer, the term of this patent is extended or adjusted under 35 U.S.C. 154(b) by 310 days.

(21) Appl. No.: 17/081,843

(22) Filed: Oct. 27, 2020

(65) Prior Publication Data
US 2021/0241473 A1     Aug. 5, 2021

Related U.S. Application Data

(60) Provisional application No. 62/968,041, filed on Jan. 30, 2020, provisional application No. 62/968,035, filed on Jan. 30, 2020.

(51) Int. Cl.
G06T 7/00 (2017.01)
G06T 7/50 (2017.01)

(52) U.S. Cl.
CPC ...... *G06T 7/50* (2017.01); *G06T 2207/20081* (2013.01); *G06T 2207/20084* (2013.01)

(58) Field of Classification Search
CPC ............ G06T 7/50; G06T 2207/20081; G06T 2207/20084; G06T 19/006;
(Continued)

(56) References Cited

U.S. PATENT DOCUMENTS

| 6,057,859 A | 5/2000 | Handelman |
| 9,336,602 B1 | 5/2016 | Chang |

(Continued)

FOREIGN PATENT DOCUMENTS

| GB | 2568278 | 5/2019 |
| WO | WO-2018/146558 A2 | 8/2018 |

(Continued)

OTHER PUBLICATIONS

Alex Kendall et al. "End-to-End Learning of Geometry and Context for Deep Stereo Regression", 10 pages.
(Continued)

*Primary Examiner* — Ping Y Hsieh
(74) *Attorney, Agent, or Firm* — Trellis IP Law Group, PC

(57) ABSTRACT

Embodiments allow live action images from an image capture device to be composited with computer generated images in real-time or near real-time. The two types of images (live action and computer generated) are composited accurately by using a depth map. In an embodiment, the depth map includes a "depth value" for each pixel in the live action image. In an embodiment, steps of one or more of feature extraction, matching, filtering or refinement can be implemented, at least in part, with an artificial intelligence (AI) computing approach using a deep neural network with training. A combination of computer-generated ("synthetic") and live-action ("recorded") training data is created and used to train the network so that it can improve the accuracy or usefulness of a depth map so that compositing can be improved.

20 Claims, 4 Drawing Sheets

(58) Field of Classification Search
CPC . G06T 2207/10024; G06T 2207/10028; G06T 7/33; H04N 2013/0081; H04N 5/232; H04N 5/247

See application file for complete search history.

(56) References Cited

U.S. PATENT DOCUMENTS

| | | | |
|---|---|---|---|
| 9,378,575 | B1 | 6/2016 | Talbot et al. |
| 9,392,264 | B1 | 7/2016 | Chang |
| 9,582,928 | B2 | 2/2017 | Cho |
| 9,947,108 | B1 | 4/2018 | Chen |
| 10,825,148 | B2 | 11/2020 | Tagra |
| 11,158,073 | B2 * | 10/2021 | Schmidt .................. G06T 7/50 |
| 2002/0191109 | A1 | 12/2002 | Kriegman |
| 2004/0264806 | A1 | 12/2004 | Herley |
| 2009/0003702 | A1 | 1/2009 | Ofek |
| 2010/0060793 | A1 | 3/2010 | Oz |
| 2011/0025853 | A1 * | 2/2011 | Richardson ............ H04N 5/247 |
| | | | 348/E7.085 |
| 2011/0293142 | A1 | 12/2011 | Van Der Mark |
| 2012/0045095 | A1 | 2/2012 | Tate |
| 2012/0314077 | A1 | 12/2012 | Clavenna, II |
| 2015/0097827 | A1 | 4/2015 | Reidharr |
| 2016/0253809 | A1 | 9/2016 | Cole |
| 2016/0253829 | A1 | 9/2016 | Cole |
| 2016/0314593 | A1 | 10/2016 | Metzler |
| 2016/0335748 | A1 | 11/2016 | Newson |
| 2017/0289623 | A1 | 10/2017 | Bailey |
| 2017/0294006 | A1 | 10/2017 | Cabral |
| 2017/0359523 | A1 | 12/2017 | Rubinstein |
| 2018/0089903 | A1 | 3/2018 | Pang |
| 2018/0189974 | A1 | 7/2018 | Clark et al. |
| 2018/0336669 | A1 | 11/2018 | Mertens |
| 2018/0350136 | A1 | 12/2018 | Rowley |
| 2019/0295227 | A1 | 9/2019 | Wang |
| 2020/0019921 | A1 | 1/2020 | Buibas |
| 2020/0118594 | A1 | 4/2020 | Oxholm |
| 2020/0193623 | A1 | 6/2020 | Liu |
| 2020/0286284 | A1 | 9/2020 | Grabli |
| 2021/0004976 | A1 * | 1/2021 | Guizilini .................. G06N 5/04 |
| 2021/0042950 | A1 | 2/2021 | Wantland |
| 2021/0065379 | A1 * | 3/2021 | Zhang ...................... G06T 7/269 |

FOREIGN PATENT DOCUMENTS

| | | |
|---|---|---|
| WO | WO-2019/079752 A1 | 4/2019 |
| WO | PCT/NZ2020/050113 | 9/2020 |
| WO | PCT/NZ2020/050114 | 9/2020 |
| WO | PCT/NZ2021/050008 | 1/2021 |
| WO | PCT/NZ2021/050020 | 2/2021 |

OTHER PUBLICATIONS

Jiahao Pang et al.' "Cascade Residual Learning: A Two-stage Convolutional Neutral Network for Stereo Matching"; 9 pages.

Sameh Khamis et al,; "Stereo-Net: Guided Hierarchical Refinement for Real-Time Edge-Aware Depth Prediction"; 2018 aarXiv 1807.08865; 18 pages.

Olaf Ronneberger et al.; "U-Net: Convolutional Networks for Biomedical Image Segmentation", 2015, arXiv: 1505.04597; 8 pages.

Yinda Zhang et al.: "Physically-Based Rendering for Indoor Scene Understanding Using Convolution Networks", CVPR paper provided by the Computer Vision Foundation; 9 pages.

Jaeho Lee et al: "Removing Forground Objects by Using Depth Information From Multi-View Images," Proceedings of SPIR, vol. 6696, Sep. 13, 2007 [Sep. 13, 2007].

Diego Ortin et al: "Occlusion-Free Image Generation for Realistic Texture Mapping," International Archives of the Photogrammetry. Remote Sensing and Spatial Information Sciences., May 8, 2012 [May 8, 2012], XP055762571,Retrieved From the Internet: URL: http://citeseerx.ist.psu.edu/viewdoc/download?doi=10.1.1.70.9379 &rep=repl&typr=pdf.

Non-Patent Literature; Written Opinion of the International Search Report for International Application No. PCT/NZ2021/050008 filed Jan. 28, 2021; 9 pages.

Matsuyama et al. "Multi-Camera Systems for 3D Video Production." 3D Video and its Applications. Springer, London, 2012. 17-44. (Year: 2012).

Jiahao Pang et al.; "Cascade Residual Learning: A Two-stage Convolutional Neural Network for Stereo Matching"; 9 pages.

Sameh Khamis et al,; "StereoNet: Guided Hierarchical Refinement for Real-Time Edge-Aware Depth Prediction", 2018, arXiv:1807.08865; 18 pages.

Yinda Zhang et al,; "Physically-Based Rendering for Indoor Scene Understanding Using Convolutional Neural Networks", CVPR paper provided by the Computer Vision Foundation; 9 pages.

* cited by examiner

SYSTEM FOR IMAGE COMPOSITING INCLUDING TRAINING WITH SYNTHETIC DATA

CROSS REFERENCES TO RELATED APPLICATIONS

This application claims the benefit of U.S. Provisional Patent Application Ser. No. 62/968,041, entitled SYSTEM USING ARTIFICIAL INTELLIGENCE TO GENERATE A DEPTH MAP INCLUDING TRAINING WITH SYNTHETIC DATA, filed on Jan. 30, 2020 (WD0002PP2); and from U.S. Provisional Patent Application Ser. No. 62/968,035, entitled METHOD FOR GENERATING PER PIXEL DEPTH INFORMATION, filed on Jan. 30, 2020; which are both hereby incorporated by reference as if set forth in full in this application for all purposes.

This application is related to the following applications: U.S. patent application Ser. No. 17/018,943, entitled COMPUTER-GENERATED IMAGE PROCESSING INCLUDING VOLUMETRIC SCENE RECONSTRUCTION filed Sep. 11, 2020 which claims priority to U.S. Provisional Application No. 62/983,530 entitled COMPUTER-GENERATED IMAGE PROCESSING INCLUDING VOLUMETRIC SCENE RECONSTRUCTION filed Feb. 28, 2020 which are hereby incorporated by reference as if set forth in full in this application for all purposes.

BACKGROUND

Many visual productions (e.g., movies, video) use a combination of real and digital images. For example, a live actor may be in a scene with a computer-generated ("CG," or merely "digital") charging dinosaur. An actor's face may be rendered as a monster. An actress may be rendered as a younger version of herself, etc. In order to allow the creators (i.e., director, actors) of the live action scenes to better interact with and utilize the digital models it is desirable to provide the live action creators with a close approximation of what the final composited imagery will look like at the time of recording, or "shooting," the live action scenes.

Since recording live action occurs in real time and often requires many "takes" it is useful to be able to generate the composited imagery in real time, or near real-time, so that an on-set assessment of the recorded takes can be made. This approach also allows the human creators to more accurately interact with and react to the digital imagery.

However, such real-time processing to composite the CG with live action is often difficult because of the large amount of data involved and due to the computing difficulty of accurately matching depth information between the live action and CG images. For example, it is necessary to determine depths (e.g., distance from camera) of elements in a live action scene in order to accurately composite the live action elements with CG images in a realistic way.

SUMMARY

One embodiment uses one or more auxiliary, or "depth," cameras to obtain stereo depth information of live action images. Each auxiliary camera outputs a standard RGB or grayscale image for purposes of comparing the different views to obtain depth information (although other cameras or sensors can be used such as infrared (IR) or RGBIR, time-of-flight, LIDAR, etc.). The depth information is correlated to picture images from a main image capture device (e.g., a main cinema camera sometimes referred to as a "hero" camera or "picture" camera) that captures the same live action as the auxiliary cameras. The raw auxiliary camera images are subjected to various steps such as one or more of pre-processing, disparity detection, feature extraction, matching, reprojection, infilling, filtering, and other steps. The result of the steps is a depth map that is then aligned to the image from the picture camera. In an embodiment, each picture element (pixel) in the picture camera's image is provided with a depth value. This allows elements or objects in the picture image to be accurately integrated with a CG image. CG elements may be integrated into live action images or vice versa. The resulting composite image is then displayed and shows the live action accurately composited with the CG elements. Although the auxiliary cameras are described as dedicated and distinct from the picture camera, in other embodiments depth information can be computed from any two or more cameras including using the picture camera described herein.

In an embodiment, steps of one or more of feature extraction, matching, filtering or refinement can be implemented, at least in part, with an artificial intelligence (AI) computing approach using a deep neural network with training. A combination of computer-generated ("synthetic") and live-action ("recorded") training data is created and used to train the network so that it can improve the accuracy or usefulness of a depth map so that compositing can be improved.

DETAILED DESCRIPTION OF EMBODIMENTS

Figure 1:
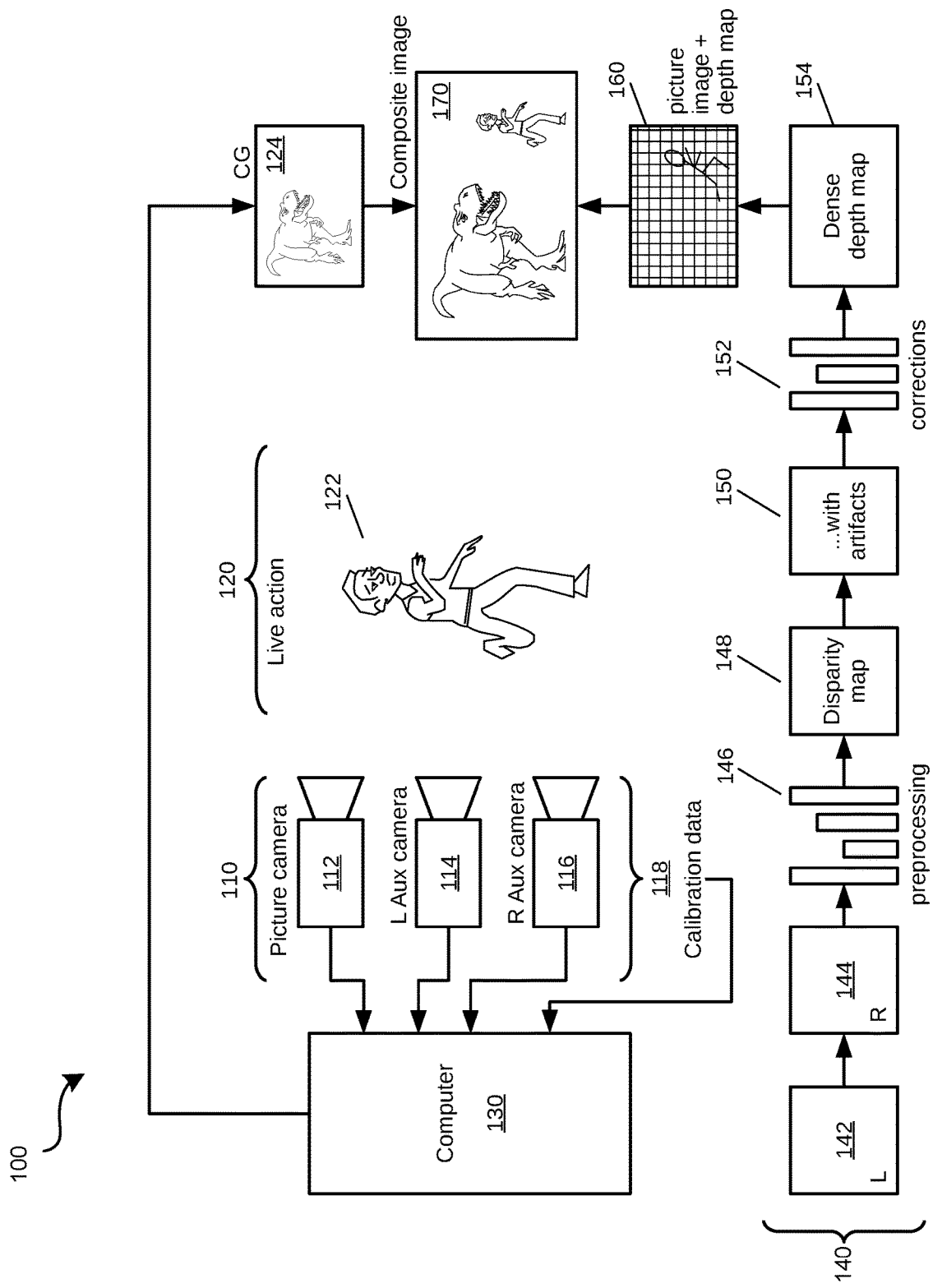
FIG. 1 illustrates basic components and steps of an embodiment.

Embodiments allow live action images from a picture camera to be composited with computer generated images in real-time or near real-time. The two types of images (live action and computer generated ("CG")) are composited accurately by using a depth map. The depth map includes a "depth value" for each pixel in the live action, or picture, image. In an embodiment, the depth value is defined as the distance between the picture camera origin and a plane that is perpendicular to the picture camera viewing direction. In other embodiments, the depth value can be referenced from a different camera or defined location; and calculated to a desired plane or point. In other embodiments, the depth can be with respect to a different reference point. Also, in some embodiments not all of the pixels need be mapped with a depth value. Rather, depth values may only need to be mapped for a region of interest. For example, parts of a scene can be masked out (greenscreen, etc.); the background may be ignored (i.e., distances past a certain value or plane), objects, or distance ranges can be identified, etc. so that they do not need to be depth-mapped to the same degree or at all. A degree of tolerance or accuracy may similarly be non-uniform over a picture image, or frame, so that areas of focus (e.g., an actor's face; an action, etc.) can be provided with heightened depth accuracy over other areas in a frame of the picture camera.

In an embodiment, the compositing process is performed in real-time. That is, each frame is composited so that it is ready for display at a standard frame rate being used for playback (e.g., 30 or 24 frames per second, etc.). It is desirable to reduce any delay between an image acquisition and display of a composited image. One embodiment achieves a delay in the range of 2 to 4 frames at a predetermined framerate. This allows the team shooting the live action to be able to view the composited images essentially concurrently with the recording of the live action and enables a director, cinematographer, actors, special effects persons, etc., to coordinate the live action more effectively with the computer-generated images. This approach also allows the composited images, or portions thereof, to be used with standard flat panel monitors, augmented reality, virtual reality, or other types of visual output devices. In other embodiments, frames may be skipped, or dropped, or the compositing modified to be slower than real time while still achieving desired functionality. Various aspects of the features described herein may be useful at other times or places such as in a post production facility.

In an embodiment, a dataset is received that includes a plurality of images and depths of objects in an environment. The dataset is used to train a deep neural network to assist, at least in part, in generating a depth map for use in real-time compositing of a live action recording taking place in the environment. Functionality described herein can be implemented using various programming techniques unless otherwise indicated. Functionality can be performed by one or more computers or processors executing instructions to control the processors or computers. The instructions may be provides on a machine-readable medium. The processor or computer-readable medium can comprise a non-transient storage medium, such as solid-state memory, a magnetic disk, optical disk etc., or a transient medium such as a signal transmitted over a computer network.

In an embodiment, one or more images from the one or more auxiliary cameras are processed to generate a depth map for elements of a picture image from a camera. The depth map is correlated with at least a portion of picture elements in at least one picture image received from a picture camera using the correlated depth map to composite one or more digital elements with one or more picture elements. In a stereo approach, depths of the picture elements are determined by using two or more images from two or more auxiliary cameras to generate a depth map. The depth map is correlated with at least a portion of picture elements in at least one of the picture images, and the correlated depth map is used to composite one or more digital elements with one or more picture elements. The compositing may be performed by one or more processors or computer systems. Processor-implementable instructions to control the processor or computer to perform one or more steps of the method may be provided on a machine (e.g., processor or computer-readable) medium. The computer-readable medium can comprise a non-transient storage medium, such as solid-state memory, a magnetic disk, optical disk etc., or a transient medium such as a signal transmitted over a computer network. In other approaches, depth information may be obtained by any one or more other cameras or other types of sensing devices. For example, multiple pairs of machine-vision cameras can be used at different locations and orientations on a set. The main imaging camera (also called a "hero" camera or a "picture" camera) can include a stereo pair of cameras for 3D filming. Single cameras or other sensors can be used to obtain depth information. Examples of such cameras and sensor s are described in, for example, U.S. patent application Ser. No. 17/018,943, referenced above.

FIG. 1 illustrates basic components and steps of a system to perform real-time compositing of live action images with computer-generated images.

FIG. 1 illustrates basic components and steps of a system to perform real-time compositing of live action images with computer-generated images. The term "real-time" as used to describe depth map generation, processing and use in compositing; includes "near real-time" where there is a short delay or lag in processing, Since the depth map generation starts at the same time as, or slightly after, the capture of a picture frame, the depth map will not be available until after the captured frame is available.

In FIG. 1, system 100 includes a live action camera rig 110. Camera rig 110 includes picture camera 112 and left and right auxiliary cameras 114 and 116, respectively. In the system illustrated in FIG. 1, depth information is obtained by using left and right stereo view cameras in order to calculate the depth of each pixel in an image or frame captured by picture camera 112. In an embodiment, the picture camera is at 2K resolution and the auxiliary cameras are at 2k resolution. In other embodiments varying resolutions for the cameras may be used. One approach uses resolutions adequate so that the auxiliary camera frames can be used to compute a depth map for each pixel in a frame of an image from the picture camera. During shooting, all 3 cameras are maintained in fixed positions with respect to each other. The cameras can be mounted on a common physical structure, for example. Depending on the cinematic needs of the shot, the cameras may be stationary, mounted on a boom or dolly, handheld, etc. In general, any suitable arrangement or configuration of cameras may be used. In other embodiments a fixed arrangement between cameras may not be necessary such as if the relative arrangement of cameras is otherwise known or defined.

In other embodiments, other approaches to obtain depth information may be used. For example, structured light, time-of-flight, photogrammetry, etc. techniques may be employed. One or more auxiliary cameras may be used. Other variations are possible.

In general, the live action camera rig is used to record live action such as moving actors, vehicles or other objects. However, the live action scene need not require movement. Even where the camera changes position within an inanimate setting, or even where the camera and scene are static, the accuracy of compositing is important for the creators of the film or video to have confidence that they have achieved the desired shot.

The picture image and the left and right depth images, also referred to as "frames," are provided to computer system 130. Computer system 130 is merely a representation of various computing resources that can be used to perform the process actions and steps described below. Any number and type of discrete or integrated hardware and software components may be used. The components may be located local to, or remote from, the cameras as, for example, interlinked by one or more networks.

Calibration data 118 from the camera rig is also sent to the computer system. This data can include the relative positions of the cameras to each other, lens information (focal length, aperture, magnification, etc.) rig position and orientation, or other data useful to calibrate the multiple sets of images being generated.

Computer system 130 can either generate images or retrieve previously stored computer graphic images such as frame 124. Since the CG images are created based on computer models, all of the depth information is already defined for each of their elements. The remaining steps of FIG. 1 are needed to quickly and accurately determine depth information for elements in the picture camera image in order that the live action image can be accurately placed "into" (i.e., composited with) the CG image.

In FIG. 1, steps or acts at 140 are used to generate a depth map that includes depth information for each pixel of the image from the picture camera.

Left image 142 from left auxiliary camera 114, together with right image 144 from right auxiliary camera 116 are processed at 146. This pre-processing compares the differences, or "disparity," between the images' to generate disparity map 148. The disparity processing can use known or future methods based on parallax effects, modeling, training, lighting or other characteristics of the images. Computation can use machine learning approaches such as artificial neural networks. Other techniques can be used. Disparity processing may remove distortions and unwanted camera or lens effects and other image anomalies.

Disparity map 148 is then re-projected onto the picture image using camera calibration data. In this operation, the resulting disparity map may have artifacts, such as "holes," "gaps," or other types of discontinuities in its image and depth information, as represented at 150. As a result, corrections processing 152 may be necessary to correct the artifacts. In an embodiment, an artificial intelligence process is used to perform infilling and densification to remove holes.

The result of correcting artifacts (if necessary) is dense depth map 154. In an embodiment, the dense depth map is at the same or higher resolution than the picture image so that it can be mapped to the picture image to provide a depth for each pixel in the picture image. This picture image plus depth map is shown as output 160. The output 160 is then composited with CG image 124 to produce composite image 170 where the live action image is properly placed into the CG image based on the derived depth information from steps 140.

Using the dense depth map, various items in the CG image will be properly placed and masked behind items in the live action image or vice versa. Additional features can be provided in the compositing, such as to allow making objects transparent or semi-transparent in order to see image items that would otherwise be occluded. The correct placement of live action elements in depth can assist in the use of transparency in the CG. Similarly, additional features or effects such as shadowing/lighting (e.g. CG object drops shadow on live action actor) can be generated and composited more realistically.

Figure 2:
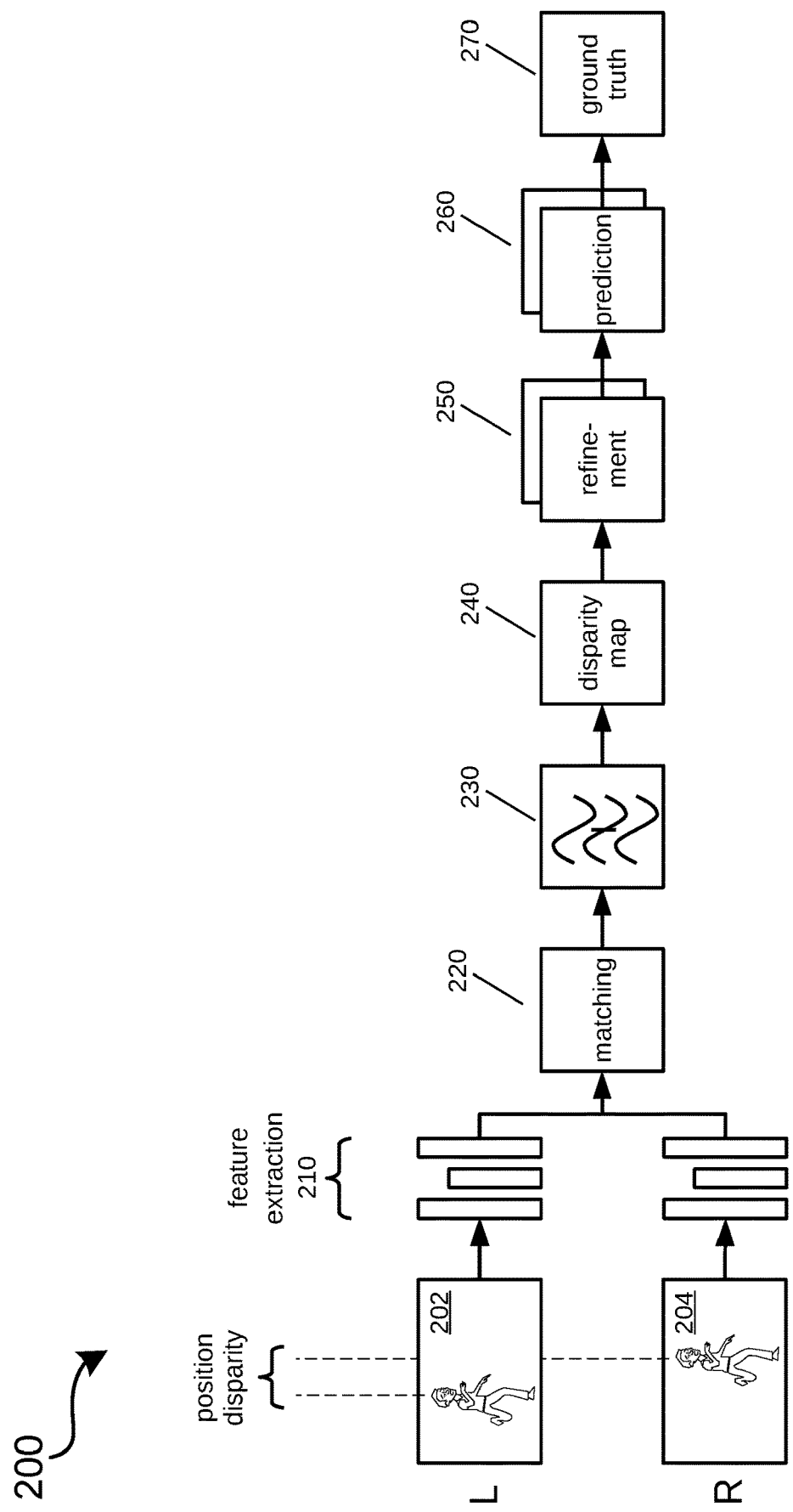
FIG. 2 shows basic sub-steps in pre-processing.

FIG. 2 shows basic sub-steps in pre-processing step 146 of FIG. 1.

In an embodiment, deep neural network techniques are used to implement one or more of the steps of FIG. 2. In other embodiments, other programming techniques may be used instead of, or in addition to, the specifics described herein. For example, other artificial intelligence approaches can be employed such as those known in the field of machine learning, or otherwise. In applications where specific hardware (e.g., graphics processing units (GPUs), application-specific integrated circuits (ASICs), custom or semi-custom processors, etc.), is used to accelerate computation it may be useful to include legacy approaches to problem solving such as procedural or "brute force" techniques. In other embodiments, any of a number of deep learning architectures currently known or yet to be devised, may be employed. For example, deep belief networks, recurrent neural networks, convolutional neural networks, etc., may be used.

In FIG. 2, the pre-processing determines differences among the same parts or features of items in the left and right auxiliary camera images. The features may be large or small depending on the degree of interest or importance to the ultimate compositing, and depending on the image area occupied by the feature. For example, a feature may be a person, an eye, eyelash, etc. At step 210, feature maps from the 202 and 204 images are extracted. At step 220 feature maps are compared to determine same features in the depth images. Step 230 applies convolution filtering to achieve coarse volumetric placement and matching at a low resolution (240).

At step 250 refinement is then performed at high resolution using the original position disparity images to check and adjust how the modeled scene with coarse depths can be more precisely positioned in depth dimension. Step 260 shows a predicted image that can be used to "train" the system when compared to ground truth mapping 270 ("recorded" or "synthetic" data). The system uses silhouettes or outlines of the objects and encourages correct alignment of the outlines to reduce hops or jumps in pixel images from frame to frame so that the final rendered sequence is continuous.

Color images and depth maps are used as reference data, such as ground truth 270 data, to compare generated or predicted frames (such as predicted frames at 260) and correct the model so that predicted frames are closer to the training data obtained. Training data can be based on recorded or synthetic data. In one embodiment, synthetic training data is based on LIDAR or photogrammetric scans of actors and objects on the actual set. In other embodiments synthetic data can be obtained in any suitable manner.

Figure 3:
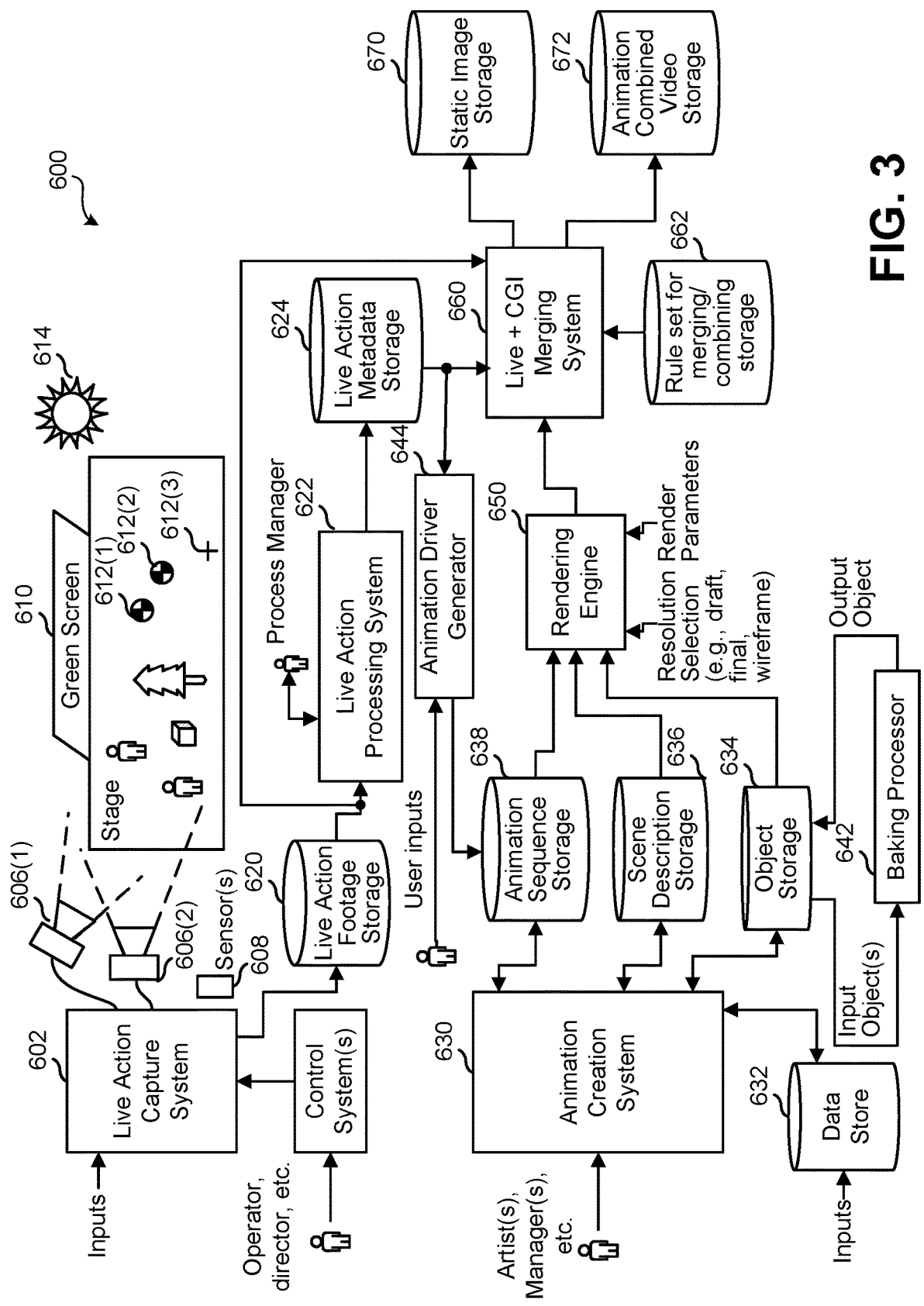
FIG. 3 illustrates an example of visual content generation system.
Figure 4:
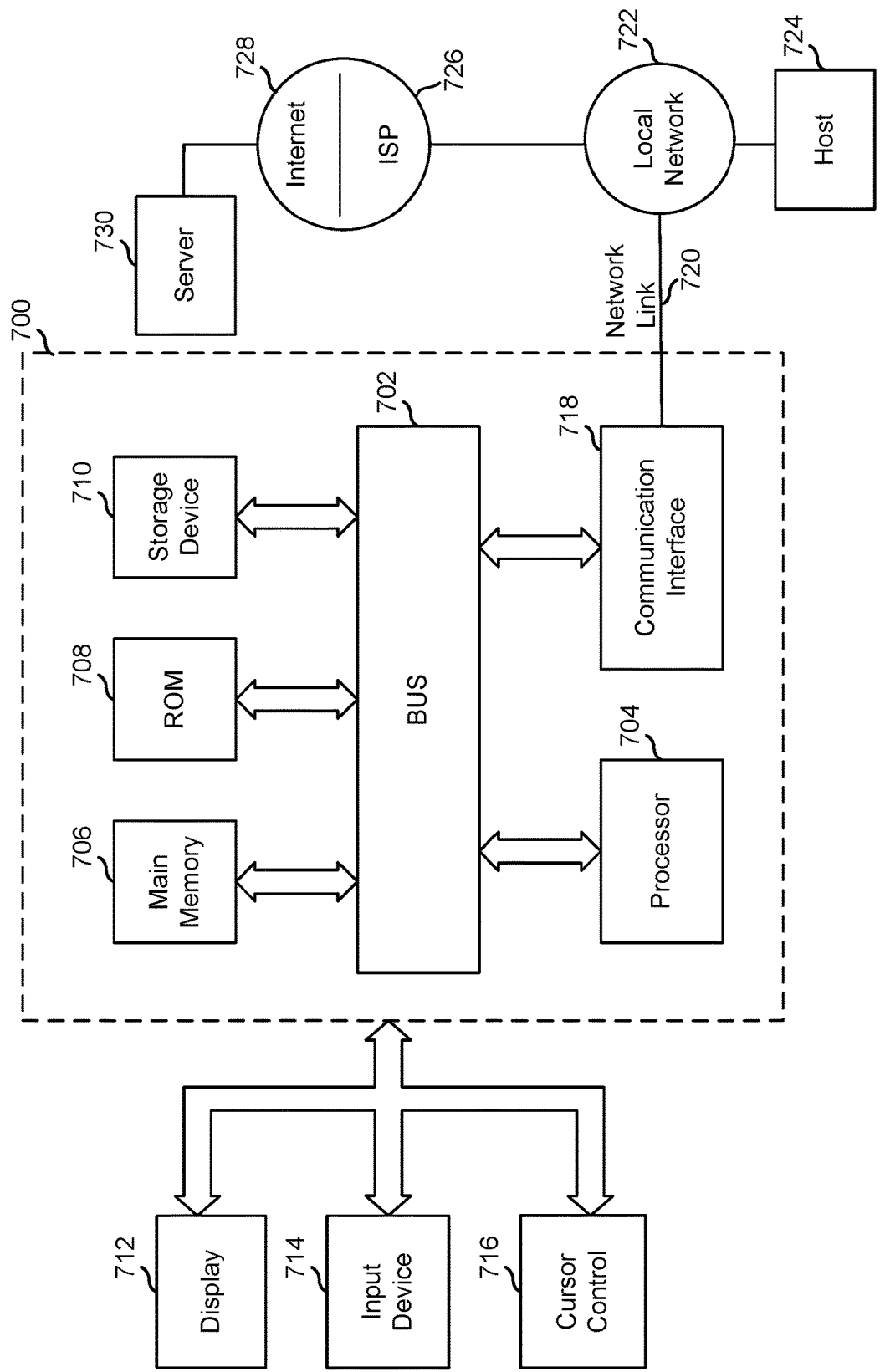
FIG. 4 shows a block diagram illustrating an example computer system adaptable for use with functions described herein.

The sequence of steps in FIG. 2 for pre-processing to generate an improved disparity map can also be used to improve disparity map with artifacts 150 of FIG. 1. The picture image can be combined with disparity map with artifacts 150. In other words, each of steps 250-270 may be applied to an initial disparity map with artifacts such as 150 of FIG. 1 to generate an improved disparity map without artifacts FIG. 3 is a block diagram of an exemplary computer system 900 for use with implementations described herein. Computer system 900 is merely illustrative and not intended to limit the scope of the claims. One of ordinary skill in the art would recognize other variations, modifications, and alternatives. For example, computer system 900 may be implemented in a distributed client-server configuration having one or more client devices in communication with one or more server systems.

In one exemplary implementation, computer system 900 includes a display device such as a monitor 910, computer 920, a data entry device 930 such as a keyboard, touch device, and the like, a user input device 940, a network communication interface 950, and the like. User input device 940 is typically embodied as a computer mouse, a trackball, a track pad, wireless remote, tablet, touch screen, and the like. Moreover, user input device 940 typically allows a user to select and operate objects, icons, text, characters, and the like that appear, for example, on the monitor 910.

Network interface 950 typically includes an Ethernet card, a modem (telephone, satellite, cable, ISDN), (asynchronous) digital subscriber line (DSL) unit, and the like. Further, network interface 950 may be physically integrated on the motherboard of computer 920, may be a software program, such as soft DSL, or the like.

Computer system 900 may also include software that enables communications over communication network 952 such as the HTTP, TCP/IP, RTP/RTSP, protocols, wireless application protocol (WAP), IEEE 902.11 protocols, and the like. In addition to and/or alternatively, other communications software and transfer protocols may also be used, for example IPX, UDP or the like. Communication network 952 may include a local area network, a wide area network, a wireless network, an Intranet, the Internet, a private network, a public network, a switched network, or any other suitable communication network, such as for example Cloud networks. Communication network 952 may include many interconnected computer systems and any suitable communication links such as hardwire links, optical links, satellite or other wireless communications links such as BLUETOOTH, WIFI, wave propagation links, or any other suitable mechanisms for communication of information. For example, communication network 952 may communicate to one or more mobile wireless devices 956A-N, such as mobile phones, tablets, and the like, via a base station such as wireless transceiver 954.

Computer 920 typically includes familiar computer components such as a processor 960, and memory storage devices, such as a memory 970, e.g., random access memory (RAM), storage media 980, and system bus 990 interconnecting the above components. In one embodiment, computer 920 is a PC compatible computer having multiple microprocessors, graphics processing units (GPU), and the like. While a computer is shown, it will be readily apparent to one of ordinary skill in the art that many other hardware and software configurations are suitable for use with the present invention. Memory 970 and Storage media 980 are examples of tangible non-transitory computer readable media for storage of data, audio/video files, computer programs, and the like. Other types of tangible media include disk drives, solid-state drives, floppy disks, optical storage media and bar codes, semiconductor memories such as flash drives, flash memories, random-access or read-only types of memories, battery-backed volatile memories, networked storage devices, Cloud storage, and the like.

As mentioned, above, one or more of the steps illustrated and described in connection with FIG. 1 or 2 may be performed with AI techniques. An embodiment uses a deep neural network with a training dataset to implement steps of feature extraction, matching, filtering and/or refinement. The training dataset can use images and depth reference data obtained by capturing or scanning the real-world people and objects. For example, the walls, furniture, props, actors, costumes, and other objects and even visual effects can be initially captured (i.e., "digitized") by using LIDAR, photogrammetry, or other techniques. This results in highly accurate depth and color texture information for objects captured in the images. This "recorded" data can then be used, in turn, to generate "synthetic" data by using the recorded data in computer modeling and rendering programs to change the positions of objects, camera characteristics and placement, environmental effects (e.g., lighting, haze, etc.) within the computer-generated scene and to capture images of the scenes along with the computer-generated depth information for the items in the images.

In addition to generating recorded and synthetic datasets from the actual movie set on which the filming is to take place, generic datasets may be obtained of unrelated sets or environments. Any one or more of these types of data, or mixtures or combinations of data; can be combined into a "training dataset," used to improve the later real-time depth detection during a live-action shoot so that digital images can be more accurately composited onto, e.g., a director's camera viewfinder or an actor's virtual or augmented reality headset; in order to show what the final, composited, scene will look like.

In an embodiment, custom synthetic data is obtained by capturing key aspects of the actual set or environment that will be used in an upcoming live action shoot where views of composite CG and live action are desired to be presented in real time. Actors and costumes can be captured in various poses and positions on the set. Other characteristics of the physical set and environment can be captured such as lighting, object positionings, camera view positioning and settings, camera noise, etc.

Once captured, the custom recorded data is imported into a computer graphics rendering program so that the objects may be digitally repositioned. Lighting and noise or other effects can be added or subtracted in the digital images. Actors can be posed and placed along with various props and effects, if desired. Selected images of these synthesized views can be captured along with their depth information. In an embodiment, only the synthetic data obtained from custom recorded data is used to comprise the training dataset. However, in other embodiments, any desired combinations of recorded, custom recorded and/or synthetic data can be used. One embodiment uses semi-synthetic data where one or a few recorded data instances are used to generate many synthetic instances.

Although it can be beneficial to create the dataset using data recorded from the actual set to be used ("custom recorded data"), in other embodiments a dataset may be pre-compiled from recorded data from one or more unrelated sets or environments. This pre-compiled dataset can then be used to train a deep neural network to be used for real-time compositing when live-action shooting occurs in a different setting, environment or location.

In one embodiment, a training dataset is synthesized from custom recorded data from scanning an actual set to be used in a future shoot. The training dataset is then used to train a deep neural network to improve the depth mapping of images in real time when the future shoot is undertaken. Details of known procedures for training using datasets are provided in, e.g., reference (5), cited above.

A machine learning training approach includes starting with random weights. Predictions are made by the network. The differences between the predicted and actual depths are computed and the weights are changed to make the prediction closer according to a scoring function. This is repeated until suitable training has been achieved for a threshold number of images. The size of the training dataset may vary widely, such as from one or a few to hundreds of thousands or millions of images.

In an embodiment, higher importance is assigned to edges or silhouettes of objects.

Depending on the resolution of the images, and number of images in the dataset, and other factors, training can take from hours up to one or more weeks. Evaluation of the effectiveness of the training can be performed visually by a human operator after an initial automatic evaluation, although in other embodiments the training evaluation actions can be automated in different arrangements including wholly manual or wholly automated. An operator interface is provided to allow a human to change settings. During the live action filming an operator can change settings on the auxiliary cameras (used to capture depth disparity information). Camera positions (distance apart), gain, brightness or other characteristics can be adjusted to improve the depth map generation. Differently trained neural networks can be available for an operator to switch from.

Data can be recorded at higher resolution for areas of interest such as human faces, furniture, etc. Information about the actual shoot can be used such as "X's" placed on the floor where actors will stand. Those areas can be subjected to more dense recording or synthesizing of data. Conversely, if it is known that areas of the set or environment will not be used then those areas can be the subject of less attention, or might be ignored entirely, for the training dataset.

One approach allows adding camera noise into the synthesized images in order to better train for the real camera images that will be handled as inputs during the live action shooting. Actual measured noise levels of cameras are used as target levels. Frequency response analysis of camera noise characteristics can be performed and those characteristics matched in the synthetic data for better training.

In an embodiment, the processing time to match a depth map to a live-action frame can be shortened by the use of a pre-stored camera parameters so that when a camera setting (e.g., focal length, etc.) is changed in the main picture camera, the corresponding change in the camera's frame captures can be applied to the depth map. Any suitable programming and/or database retrieval technique may be used. In an embodiment, a look-up table is used that includes pre-computed values for the effect of changes in the main camera settings on the resulting captured images. For example, if there is a focal length change at the main camera a lookup table entry corresponding to the new focal length is used and applied to the depth map in order that the depth map be modified ("distorted") in the same way as the captured main images. This approach can similarly be used for changes in other camera parameters.

Embodiments may also employ a human operator to visually inspect, in real-time, the depth map "fitting" to the captured main images and to make visual adjustments. The operator can have x, y and z (depth) adjustments and can fit the depth map to the captured image by panning and scrolling and zooming. Other controls can be provided to the operator. A combination of automated and manual matching tools can be provided at an operator interface. These approaches can be used at any one or more of the steps shown in FIG. 1 or 2.

Although the description has been described with respect to particular embodiments thereof, these particular embodiments are merely illustrative, and not restrictive. Controls can be provided to allow modifying various parameters of the compositing at the time of performing the recordings. For example, the resolution, number of frames, accuracy of depth position may all be subject to human operator changes or selection.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Some embodiments are implemented as processor implementable code provided on a computer-readable medium. The computer-readable medium can comprise a non-transient storage medium, such as solid-state memory, a magnetic disk, optical disk etc., or a transient medium such as a signal transmitted over a computer network.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory tangible processor-readable medium including instructions executable by one or more processors to perform operations comprising:
   selecting a deep neural network that has been trained using a dataset derived, at least in part, from synthetic data;
   using the selected deep neural network to process image information from one or more auxiliary cameras to generate a depth map; and
   correlating the depth map with at least a portion of picture elements in at least one picture image obtained from an image capture device;
   compositing the at least portion of the picture elements of the picture image with a computer graphics generated image that includes digital elements associated with known depth values to produce a composited image including the digital elements and the at least portion of the picture elements positioned according to the depth map; and
   displaying the composited image.

2. The non-transitory tangible processor-readable medium of claim 1, wherein the dataset includes recorded data.

3. The non-transitory tangible processor-readable medium of claim 1, wherein the dataset includes third party recorded data.

4. The non-transitory tangible processor-readable medium of claim 1, the one or more tangible media further comprising logic for:
re-projecting a disparity map into an image from the image capture device.

5. The non-transitory tangible processor-readable medium of claim 4, the one or more tangible media further comprising logic for:
infilling holes in the re-projected disparity map.

6. The non-transitory tangible processor-readable medium of claim 1, further comprising:
a signal interface for receiving image camera information and providing the image camera information to the one or more processors for processing by the deep neural network.

7. The non-transitory tangible processor-readable medium of claim 6, wherein the image camera information includes a focal length of the image camera.

8. The non-transitory tangible processor-readable medium of claim 7, wherein the correlating, compositing, and displaying are performed in real time with obtaining of the at least one picture image.

9. The non-transitory tangible processor-readable medium claim 1, wherein the deep neural network is selected based, at least in part, on a change in settings of the one or more auxiliary cameras.

10. A method for determining picture element depths, the method comprising:
selecting a deep neural network that has been trained using a dataset derived, at least in part, from synthetic data derived from a scene;
using the selected deep neural network to process image information of the scene from one or more auxiliary cameras to generate a depth map;
correlating the depth map with at least a portion of picture elements in at least one of the picture images obtained from an image capture device; and
compositing the at least portion of the picture elements of the picture image with a computer graphics generated image that includes digital elements associated with known depth values to produce a composited image including the digital elements and the at least portion of the picture elements positioned according to the depth map.

11. The method of claim 10, wherein the dataset includes recorded data.

12. The method of claim 10, wherein the dataset includes third party recorded data.

13. The method of claim 10, further comprising:
re-projecting a disparity map into an image from the image capture device.

14. The method of claim 13, further comprising infilling holes in the re-projected disparity map.

15. The method of claim 14, further comprising receiving image camera information and providing the deep neural network for processing.

16. The method of claim 15, wherein the image camera information includes a focal length of the image camera.

17. The method of any one of claim 16, wherein correlating, compositing, and displaying are performed in real time with obtaining of the at least one picture image.

18. A method for generating a depth map, the method comprising:
generating a dataset including a plurality of images and depths of objects in predefined area of interest to be used in a live action recording of a scene, whereas other areas of the scene not to be used in the live action recording are ignored or are the subject of less images than the predefined area, in generating the dataset; and
using the dataset to train a deep neural network to assist, at least in part, in generating a depth map for use in real-time compositing of the live action recording taking place in the scene with a computer graphics generated image that includes digital elements associated with known depth values.

19. The method of claim 18, wherein the dataset includes recorded data.

20. The method of claim 18, wherein silhouettes or outlines of the objects are used for the dataset.

* * * * *